(12) United States Patent
Feigel

(10) Patent No.: US 11,390,258 B2
(45) Date of Patent: Jul. 19, 2022

(54) ELECTROHYDRAULIC MOTOR VEHICLE CONTROL DEVICE

(71) Applicant: Continental Teves AG & Co. oHG, Frankfurt am Main (DE)

(72) Inventor: Hans-Jörg Feigel, Rosbach (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 0 days.

(21) Appl. No.: 16/331,582

(22) PCT Filed: Sep. 1, 2017

(86) PCT No.: PCT/EP2017/073548
§ 371 (c)(1),
(2) Date: Mar. 8, 2019

(87) PCT Pub. No.: WO2018/054864
PCT Pub. Date: Mar. 29, 2018

(65) Prior Publication Data
US 2019/0217837 A1     Jul. 18, 2019

(30) Foreign Application Priority Data
Sep. 21, 2016   (DE) ..................... 10 2016 218 095.9

(51) Int. Cl.
*B60T 8/36*     (2006.01)
*B60T 13/66*    (2006.01)
(Continued)

(52) U.S. Cl.
CPC ............ *B60T 13/662* (2013.01); *B60T 8/368* (2013.01); *B60T 8/3675* (2013.01);
(Continued)

(58) Field of Classification Search
CPC ...... B60T 8/368; B60T 13/662; B60T 13/686; B60T 13/745; B60T 7/042
See application file for complete search history.

(56) References Cited

U.S. PATENT DOCUMENTS 5,466,055 A    11/1995   Schmitt et al.
6,079,798 A     6/2000   Hosoya
(Continued)

FOREIGN PATENT DOCUMENTS

CN    101367365 A    2/2009
DE      4133879 A1   4/1993
(Continued)

OTHER PUBLICATIONS

German Search Report for German Application No. 10 2016 218 095.9, with partial translation, dated Aug. 9, 2017—10 pages.
(Continued)

*Primary Examiner* — Robert A. Siconolfi
*Assistant Examiner* — Stephen M Bowes
(74) *Attorney, Agent, or Firm* — RatnerPrestia

(57) ABSTRACT

An electrohydraulic motor vehicle control device, in particular for a motor vehicle brake system, including a hydraulic unit with electrically activated valves and a brake-pedal-activated master brake cylinder, an electronic control unit which comprises a first printed circuit board with electrical and/or electronic components for actuating the valves, and an electric motor for driving an electrically controllable, hydraulic pressure source which is arranged on a first side face of the hydraulic unit, wherein a second printed circuit board is provided which is arranged in a region of the first side face of the hydraulic unit, wherein a first sensor element for sensing activation of a brake pedal is arranged on the second printed circuit board.

17 Claims, 2 Drawing Sheets

(51) Int. Cl.
*B60T 8/40* (2006.01)
*B60T 13/68* (2006.01)
*B60T 13/74* (2006.01)

(52) U.S. Cl.
CPC .......... *B60T 8/4081* (2013.01); *B60T 13/686* (2013.01); *B60T 13/745* (2013.01)

(56) References Cited

U.S. PATENT DOCUMENTS

| | | | |
|---|---|---|---|
| 6,120,114 | A | 9/2000 | Blazic et al. |
| 6,241,489 | B1 | 6/2001 | Lewin et al. |
| 6,305,758 | B1 | 10/2001 | Hageman et al. |
| 6,354,674 | B1 | 3/2002 | Iwamoto et al. |
| 6,634,723 | B1 | 10/2003 | Parker et al. |
| 6,969,128 | B2 | 11/2005 | Sekihara |
| 8,112,196 | B2 | 2/2012 | Takayanagi |
| 8,870,564 | B2 | 7/2014 | Yanai et al. |
| 9,103,354 | B2 | 8/2015 | Yahagi et al. |
| 9,446,745 | B2 | 9/2016 | Elliott et al. |
| 9,446,753 | B2 | 9/2016 | Feigel et al. |
| 9,566,964 | B2 | 2/2017 | Jürgens |
| 9,593,061 | B2 | 3/2017 | Heise |
| 2004/0075339 | A1 | 4/2004 | Volz |
| 2006/0108884 | A1 | 5/2006 | Shilino et al. |
| 2006/0109625 | A1 | 5/2006 | Harris et al. |
| 2008/0017174 | A1 | 1/2008 | Kafer et al. |
| 2008/0036292 | A1 | 2/2008 | Sakai et al. |
| 2009/0030571 | A1* | 1/2009 | Takayanagi ......... F15B 13/0835 701/36 |
| 2009/0095100 | A1* | 4/2009 | Toyohira ............... B60T 11/18 74/110 |
| 2009/0189437 | A1 | 7/2009 | Takimoto |
| 2009/0189439 | A1 | 7/2009 | Abe et al. |
| 2009/0189440 | A1 | 7/2009 | Abe et al. |
| 2010/0032597 | A1* | 2/2010 | Beer ..................... B60T 8/4063 251/129.01 |
| 2011/0062775 | A1 | 3/2011 | Iyatani |
| 2011/0193430 | A1 | 8/2011 | Takada |
| 2911/0193430 | | 8/2011 | Takada |
| 2012/0205987 | A1 | 8/2012 | Mahnkopf |
| 2014/0216866 | A1 | 8/2014 | Feigel et al. |
| 2015/0075156 | A1 | 3/2015 | Nakano et al. |
| 2015/0174366 | A1 | 6/2015 | Taha et al. |
| 2016/0018567 | A1 | 1/2016 | Jürgens |
| 2016/0264113 | A1 | 9/2016 | Feigel |
| 2016/0264114 | A1 | 9/2016 | Maruo et al. |
| 2017/0197601 | A1 | 7/2017 | Schaefer |
| 2018/0065605 | A1 | 3/2018 | Leiber et al. |

FOREIGN PATENT DOCUMENTS

| | | | | |
|---|---|---|---|---|
| DE | 19701637 | A1 * | 7/1998 | ............. B60K 23/00 |
| DE | 29712033 | U1 | 12/1998 | |
| DE | 10350316 | A1 | 5/2004 | |
| DE | 102009056765 | A1 | 6/2011 | |
| DE | 102012213216 | A1 | 2/2013 | |
| DE | 102012220485 | A1 | 5/2014 | |
| DE | 102014211761 | A1 | 12/2015 | |
| DE | 112014004145 | T5 | 6/2016 | |
| EP | 1016515 | A2 | 7/2000 | |
| EP | 3069945 | A2 | 9/2016 | |
| JP | 2015098289 | A | 5/2015 | |
| JP | 2015145226 | A * | 8/2015 | ............. B60T 8/404 |
| KR | 20020067638 | A | 8/2002 | |
| WO | 02060734 | A1 | 8/2002 | |
| WO | WO-2006067070 | A1 * | 6/2006 | ............. B60T 8/368 |
| WO | 2013023953 | A1 | 2/2013 | |
| WO | WO-2014124925 | A1 * | 8/2014 | ............. B60T 8/368 |
| WO | WO-2015076133 | A1 * | 5/2015 | ............ B60T 13/662 |

OTHER PUBLICATIONS

International Search Report and Written Opinion for Application No. PCT/EP2017/073548, dated Dec. 13, 2017—8 pages.
Chinese Office Action for Chinese Application No. 201780057716.7, dated Oct. 12, 2020, 6 pages.
Korean Decision for Grant of Patent for Korean Application No. 10-2019-7007001, dated Oct. 20, 2020, with translation, 3 pages.
Non Final Office Action for U.S. Appl. No. 16/327,488, dated Feb. 18, 2021, 23 pages.
Final Office Action for U.S. Appl. No. 16/327,468, dated May 25, 2021, 18 pages.
Notice of Allowance for U.S. Appl. No. 16/327,468, dated Nov. 24, 2021, 20 pages.
Chinese Office Action for Chinese Application No. 201780057274.6, dated Jul. 14, 2021 with translation, 14 pages.
Chinese Office Action for Chinese Application No. 201780057716.7, dated Jul. 16, 2021 with Search Report, 8 pages.
Programmable Logic Controllers (PLC), 2009, 5 pages.

* cited by examiner

ELECTROHYDRAULIC MOTOR VEHICLE CONTROL DEVICE

CROSS REFERENCE TO RELATED APPLICATIONS

This application is the U.S. National Phase Application of PCT International Application No. PCT/EP2017/073548, filed Sep. 19, 2017, which claims priority to German Patent Application No. 10 2016 218 095.9, filed Sep. 21, 2016, the contents of such applications being incorporated by reference herein.

FIELD OF THE INVENTION

The invention relates to an electrohydraulic motor vehicle control device.

BACKGROUND OF THE INVENTION

DE 10 2013 202 350 A1, incorporated herein by reference, has disclosed a brake control device having a hydraulic unit, an electronic control unit and an electric motor for driving a pump, which brake control device comprises a position sensor for sensing brake activation travel, wherein the position sensor pickup is arranged on a printed circuit board arranged in the electronic control unit.

WO 2013/023953 A1, incorporated herein by reference, has disclosed a brake activation unit in which a master brake cylinder which can be actuated by the vehicle driver, an electrically controllable pressure supply device and a valve arrangement are arranged in a housing. The electric motor of the pressure supply device is attached to a first side face of the housing. The electronic open-loop and closed-loop control unit of the brake activation unit is arranged on the second side face of the housing, facing in the opposite direction from the electric motor. The brake activation unit comprises a position sensor system for sensing brake pedal activation, wherein the position sensor system is arranged on the second side face of the housing 10, i.e. on the side face with respect to the electronic open-loop and closed-loop control unit.

The brake activation unit also comprises a motor position sensor system for sensing a location/position of the electric motor, e.g. a rotor position sensor. This motor position sensor system is also arranged on the second side face of the housing, facing in the opposite direction from the electric motor. The electronic open-loop and closed-loop control unit serves to actuate the valve arrangement and the pressure supply device, and the output signals of the position sensor system and of the motor position sensor system are fed thereto. When the motor position sensor system and the brake pedal activation sensor system are integrated into the electronic open-loop and closed-loop control unit arranged opposite the electric motor, the two sensors can be influenced by the external magnetic fields owing to the proximity to the valves (e.g. the valve coils), and their signals can be falsified. Furthermore, a complex and expensive gear mechanism has to be provided for the mechanical transmission of the rotational movement of the motor to the electronic open-loop and closed-loop control unit side.

SUMMARY OF THE INVENTION

An aspect of the present invention aims to overcome the specified disadvantages. Furthermore, a compact electrohydraulic motor vehicle control device, in particular for a brake-by-wire brake system for motor vehicles is to be made available which is cost-effective to manufacture.

An aspect of the invention is based on the concept of providing, in an electrohydraulic motor vehicle control device having a hydraulic unit with electrically activated valves and a brake-pedal-activated master brake cylinder, an electric motor for driving an electrically controllable, hydraulic pressure source of the motor vehicle control device which is arranged on a first side face of the hydraulic unit and an electronic control unit which comprises a first printed circuit board with electrical and/or electronic components for actuating the valves, a second printed circuit board which is arranged in a region of the first side face of the hydraulic unit, wherein a first sensor element for sensing activation of a brake pedal is arranged on the second printed circuit board.

An aspect of the invention is an electrohydraulic motor vehicle control device which comprises a hydraulic unit with electrically activated valves and a brake-pedal-activated master brake cylinder, an electronic control unit which comprises a first printed circuit board with electrical and/or electronic components for actuating the valves, and an electric motor for driving an electrically controllable, hydraulic pressure source which is arranged on a first side face of the hydraulic unit, wherein a second printed circuit board is provided which is arranged in a region of the first side face of the hydraulic unit, wherein at least a second sensor element for sensing a location or position of the electric motor is arranged on the second printed circuit board.

An advantage of an aspect of the invention is that the first and/or the second sensor elements are disrupted less by the electrical and/or electronic components for actuating the valves in the electronic control unit (e.g. the magnetic fields of the valve coils). Furthermore, as result of the arrangement of the first and/or second sensor element on the second printed circuit board in the region of the electric-motor-side side face of the hydraulic unit, it is possible to save space on the first printed circuit board, and/or sensor principles which were previously not under consideration owing to the limited installation space on the first printed circuit board can now be considered for the first and/or second sensor device.

The electronic control unit is preferably arranged on a second side face of the hydraulic unit which is different from the first side face. The second side face is particularly preferably opposite the first side face, i.e. the electronic control unit is arranged on the side face facing in the opposite direction from the electric motor, also in order to permit a simple electrical or magnetic connection between the valves and the control unit.

The first sensor element is preferably arranged on a face of the second circuit board which faces the hydraulic unit, since in this way the susceptibility of the measurement of the activation of the brake pedal to disruption is lower owing to the greater spatial proximity to the hydraulic unit.

The first sensor element preferably senses the shifting of or the position of a shiftable part of the master brake cylinder. Shifting of a piston of the master brake cylinder which is brought about by the activation of the brake is particularly preferably sensed.

The first sensor element is preferably part of a first sensor device for sensing activation of the brake pedal.

The first sensor device particularly preferably comprises a travel encoder which is arranged on the shiftable part of the master brake cylinder, and a measuring pickup which is formed by the first sensor element or comprises the latter.

In addition to the first sensor element, preferably the entire electronic system or at least part of the electronic system, in particular of the electronic evaluation system, which is assigned to the first sensor element and/or the first sensor device is also arranged on the second printed circuit board.

In the first sensor device which has the purpose of sensing activation of the brake pedal and comprises the first sensor element, an eddy current measuring principle is preferably applied, since it is not sensitive to external magnetic fields.

According to one development of the motor vehicle control device according to an aspect of the invention, at least one second sensor element for sensing a location or position of the electric motor (30) is arranged on the second printed circuit board. A rotor position sensor which serves to sense the rotor position or rotational angle of the rotor of the electric motor is particular preferably present on the second printed circuit board.

The second sensor element or the second sensor elements is/are preferably arranged on a face of the second printed circuit board which faces the electric motor, since in this way the susceptibility of the measurement of the location/position of the electric motor to disruption is lower owing to the greater spatial proximity to the electric motor.

The second sensor element (or the second sensor elements) is/are preferably part of a second sensor device for sensing a location or position of the electric motor. The second sensor device particularly preferably comprises a position encoder which is arranged on a rotating part of the electric motor and a measuring pickup which is formed by the second sensor element or comprises the latter (or is formed by the second sensor elements or comprises the latter).

In addition to the second sensor element, preferably the entire electronic system or at least part of the electronic system, in particular of the electronic evaluation system, which is assigned to the second sensor element and/or the second sensor device is also arranged on the second printed circuit board.

In the second sensor device which has the purpose of sensing location or position of the electric motor and comprises the second sensor element or elements, an eddy current measuring principle is preferably applied, since it is not sensitive to external magnetic fields.

The same measuring principle is preferably used for the first sensor device and the second sensor device.

The second printed circuit board is preferably arranged between the first side face of the hydraulic unit and the electric motor. As a result, the line conduction of the sensor signals (of the first and/or second sensor elements) can be implemented directly on the second printed circuit board. This is not only cost-effective but also provides a saving in respect of the overall length of the motor.

According to one development of an aspect of the invention, the second printed circuit board has an opening through which part of the pressure source, in particular a cylinder of the pressure source, projects and/or is led. Owing to the opening, space-saving arrangement of the second printed circuit board is possible e.g. between the hydraulic unit and the electric motor.

The pressure source is preferably embodied as a hydraulic cylinder-piston arrangement whose piston can be shifted by the electric motor by means of a rotary-translatory gear mechanism.

The second sensor element or elements is/are preferably positioned adjacent to the part of the pressure source which projects through the second printed circuit board. The second sensor elements are particularly preferably positioned around the part of the pressure source which projects through the second printed circuit board. The second sensor elements are advantageously positioned concentrically around the part of the pressure source which projects through the second printed circuit board. The second sensor elements are therefore arranged concentrically around the hollow shaft of the electric motor, which increases the measuring accuracy.

The second printed circuit board can be embodied in one part or multiple parts. The second printed circuit board is preferably embodied in two parts with a first and a second printed circuit board part, wherein the first sensor element is arranged on one of the printed circuit board parts. For reasons of cost, the first sensor element is particularly preferably present only on one of the printed circuit board parts, i.e. not redundantly on both printed circuit board parts.

The second sensor element or elements is/are preferably provided redundantly on the first and the second printed circuit board parts.

In a two-part printed circuit board, the printed circuit board parts are preferably embodied in such a way that they form the opening for leading through part of the pressure source.

The supply of the second printed circuit board with electrical energy is preferably embodied redundantly. A first and a second energy source for supplying the second printed circuit board are particularly preferably present. In the case of a two-part printed circuit board, in each case an independent electrical energy source is particularly preferably provided for each of the printed circuit board parts.

According to a further development of the motor vehicle control device according to an aspect of the invention, electrical and/or electronic components for actuating the electric motor are additionally arranged on the second printed circuit board. The power electronics of the electric motor are particularly preferably arranged on the second printed circuit board. This permits the heat of the electric and/or electronic components to be conducted away more easily and more cost-effectively since the high currents during the actuation of the electric motor are conducted separately from the first printed circuit board of the electronic control unit, specifically only on the second printed circuit board. A complex cooling system for the electric and/or electronic components which conduct high currents is necessary only on the second printed circuit board. The electronic control unit and/or the first printed circuit board then conduct only comparatively low currents which are sufficient e.g. for actuating the valves and it is therefore possible to dispense with a complex cooling system of the first printed circuit board or in the electronic control unit. It is also advantageous that the first printed circuit board can be made more cost-effective, in particular with relatively small line cross sections. Furthermore, it is advantageous that there is no need for any complex through-connections, in particular for high-current lines, through the hydraulic unit.

In the case of a two-part printed circuit board, the electric and/or electronic components, in particular the power electronics, for actuating the electric motor, are preferably embodied redundantly on the first and second printed circuit board parts. This permits redundancy in the normal braking function.

According to another development of the motor vehicle control device according to an aspect of the invention, a brake pedal sensation simulator is arranged at least partially in the hydraulic unit, wherein a pressure sensor which senses a pressure of the brake pedal sensation simulator is arranged on the first printed circuit board of the electronic control unit. This permits a driver's request to be sensed in the event of the first sensor element or the first sensor device failing (fallback level).

The electric motor is preferably attached directly or indirectly to the first side face of the hydraulic unit.

The electric motor is preferably a brushless direct current motor.

The electric motor is preferably at least partially enclosed by a motor housing. The motor housing is particularly preferably injection-molded around the electric motor.

The electrically controllable, hydraulic pressure source is preferably arranged at least partially inside the hydraulic unit. A pressure space of the pressure source is particularly preferably arranged at least partially inside the hydraulic unit.

The hydraulic unit is preferably constructed essentially in a cuboid shape.

The master brake cylinder preferably comprises at least one piston which bounds a hydraulic pressure space, wherein wheel brakes can be connected to the pressure space, and wherein the piston can be activated by means of a pressure rod which transmits activation forces.

According to one preferred embodiment of an aspect of the invention, the valves are arranged on the side face of the hydraulic unit facing the opposite direction from the electric motor.

A pressure medium reservoir vessel which is under atmospheric pressure is preferably attached to an upper side face of the hydraulic unit.

The motor vehicle control device is preferably used in a brake system for motor vehicles, which brake system can be actuated in a "brake-by-wire" operating mode both by the vehicle driver and also independently of the vehicle driver, preferably is operated in the "brake-by-wire" operating mode and can be operated in at least one fallback operating mode in which only operation by the vehicle driver is possible.

BRIEF DESCRIPTION OF THE DRAWINGS

Further preferred embodiments of aspects of the invention will emerge from the subclaims and the following description with reference to figures.

In the figures.

DETAILED DESCRIPTION OF THE PREFERRED EMBODIMENTS

Figure 1:
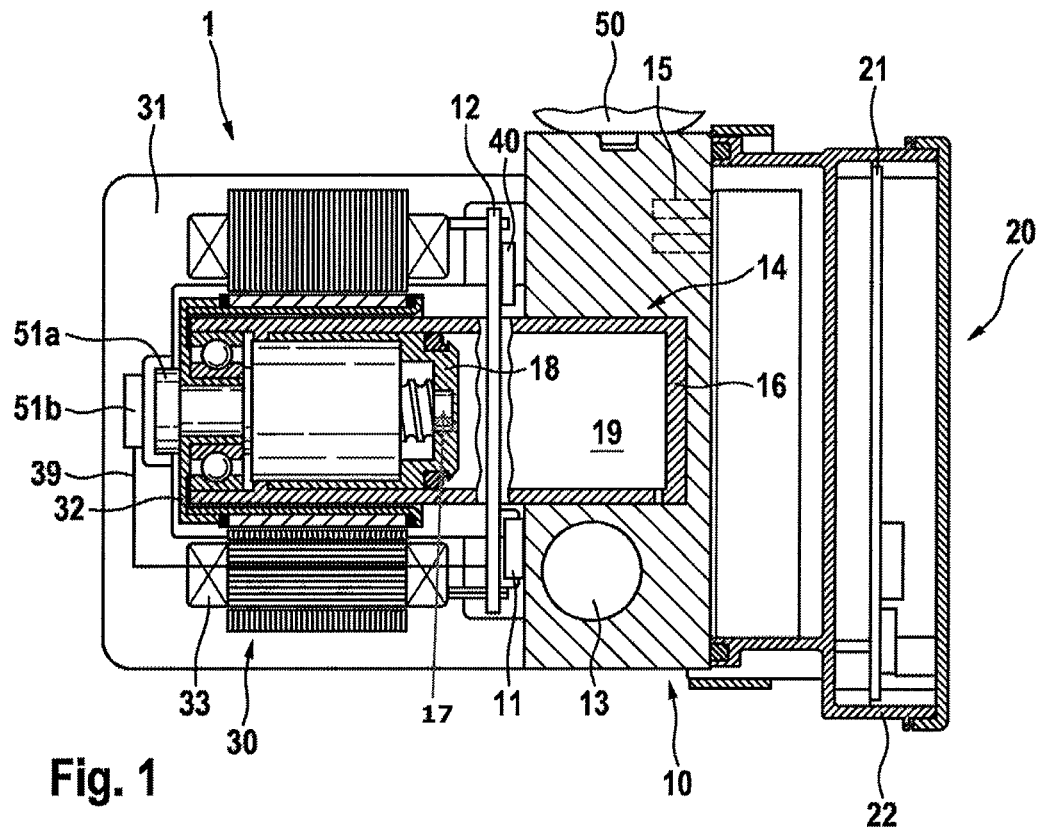
FIG. 1 shows a first exemplary embodiment of an electrohydraulic motor vehicle control device according to an aspect of the invention.

FIG. 1 shows a schematic illustration of a first exemplary embodiment of an electrohydraulic motor vehicle control device according to an aspect of the invention for a motor vehicle brake system with hydraulically activated wheel brakes. A motor vehicle control device 1 comprises a hydraulic unit 10 (HCU: hydraulic control unit) with electrically activated valves 15 and a brake-pedal-activated master brake cylinder 13, an electronic control unit 20 (ECU: electronic control unit) and an electric motor 30 for driving an electrically controllable hydraulic pressure source 14. The master brake cylinder 13 is only illustrated schematically, in the form of a cylindrical drilled hole in the hydraulic unit 10. The electric motor is arranged on a first side face of the hydraulic unit 10. A (second) printed circuit board 12, on which a first sensor element 11 for sensing activation of the brake pedal is arranged, is arranged separated from the electronic control unit 20, in a region of the first side face of the hydraulic unit 10.

The electric motor 30 comprises a rotor 32 and a stator 33 and is embodied, for example, as a brushless direct current motor. The electric motor 30 is, for example, at least partially enclosed by a motor housing 31. The motor housing 31 is embodied as a plastic injection-molded part.

The master brake cylinder 13 comprises at least one hydraulic pressure space and an activation piston (not illustrated) which can be activated by a vehicle driver by means of a pressure rod and which bounds the hydraulic pressure space. The wheel brakes (not illustrated) of the motor vehicle brake system can be connected to the pressure space by means of hydraulic connections. The master brake cylinder 13 serves e.g. for the application of pressure to the wheel brakes by the driver in a fallback operating mode of the brake system when the wheel brakes are connected to the pressure space of the master brake cylinder 13. The longitudinal axis of the master brake cylinder 13 is advantageously arranged essentially parallel to the direction of travel of the motor vehicle.

For example, the first sensor element 11 senses the shifting of or the position of a piston (not illustrated) of the master brake cylinder 13. The first sensor element 11 is therefore arranged on a face of the second printed circuit board which faces the hydraulic unit. The first sensor element 11 is, for example, part of a first sensor device for sensing activation of the brake pedal. Said sensor device comprises a travel encoder (not illustrated) which is arranged on the piston of the master brake cylinder 13 and the first sensor element 11 as a measuring pickup or part of a measuring pickup.

In addition to the first sensor element 11, the entire electronic evaluation system or at least part of the electronic evaluation system, which is assigned to the first sensor element and/or the first sensor device, is e.g. also arranged on the second printed circuit board 12.

The printed circuit board 12 is arranged, for example, between the first side face of the hydraulic unit and the electric motor. As a result, the line conduction of the signals of the first sensor element 11 can be implemented directly on the printed circuit board 12. This is not only cost-effective but also provides a saving in respect of the overall length of the electric motor.

Electric and/or electronic components 40 for actuating the electric motor 30 are also arranged on the printed circuit board 12. For example, the power electronics 40 of the electric motor 30 are arranged on the printed circuit board 12, i.e. on the electric motor side of the hydraulic unit 10. In this context, the electronic control unit 20, on the one hand, and the electric motor 30 and the second printed circuit board 12, on the other, are arranged on different, e.g. opposite, side faces of the hydraulic unit 10. The first printed circuit board 21 of the electronic control unit 20 (which does not comprise power electronics components for actuating the electric motor) can therefore be made significantly more cost-effective without thick copper layers. The high-current, and therefore expensive, second printed circuit board 12 is smaller in comparison with the first printed circuit board 21.

The electrically activated valves 15 of the hydraulic unit 10 are provided e.g. for setting wheel-specific brake pressures at the wheel brakes and/or for disconnecting/connecting the pressure source 14 or the master brake cylinder 13 to the wheel brakes. The electronic control unit 20 comprises a (first) printed circuit board 21 with electric and/or electronic components for actuating the valves 15.

The electrically controllable pressure source 14 is embodied, for example, as a hydraulic cylinder-piston arrangement whose piston 18 can be shifted in a cylinder 16 along the longitudinal axis (cylinder axis) of the cylinder-piston arrangement by the electric motor 30 by means of a rotary-translatory gear mechanism 17. The gear mechanism 17 is embodied, for example, as a ball screw drive or roller screw drive. Furthermore, there is a rotor position sensor system (indicated only schematically) which serves to sense the rotor position of the electric motor 30 and has a position encoder 51a and a measuring pickup 51b.

In a "brake-by-wire" operating mode of the brake system, the wheel brakes can be activated by means of the pressure in the pressure space 19 of the pressure source 14. For this purpose, the electric motor 30 can be actuated in accordance with activation of the brake pedal which is advantageously sensed by means of the first sensor element 11.

The pressure source 14 is arranged at least partially inside the hydraulic unit 10. For example, the cylinder 16 extends through the printed circuit board 12, which for this purpose has an opening (see reference number 45 in F 2 and 4), and into the hydraulic unit 10. Owing to the opening, space-saving arrangement of the second printed circuit board 12 is possible between the hydraulic unit 10 and the electric motor 30.

A pressure medium reservoir vessel 50 which is under atmospheric pressure is arranged on an upper side face of the hydraulic unit 10.

The master brake cylinder 13, the valves 15 and the pressure source 14 are arranged entirely or at least partially inside the hydraulic unit 10.

The hydraulic unit 10 furthermore comprises hydraulic ports (not illustrated) for the connections to the wheel brakes.

The longitudinal axis of the electric motor 30 is arranged perpendicularly or approximately perpendicularly with respect to the longitudinal axis of the master brake cylinder 13.

Likewise, the longitudinal axis of the pressure source 14 is arranged perpendicularly or approximately perpendicularly with respect to the longitudinal axis of the master brake cylinder 13. The electric motor 30 and the cylinder-piston arrangement of the pressure source 14 are arranged aligned on a common axis.

The control unit 20 comprises the printed circuit board 21 on which electric and/or electronic components for actuating the valves 15 of the hydraulic unit 10 are arranged. Furthermore, at least one connecting plug, for supplying the electronic control unit 20 or the printed circuit board 21 with electrical energy is provided on the first printed circuit board 21. The printed circuit board 21 is advantageously protected by a control device housing 22.

The control unit 20 serves at least to actuate the valves 15 and is arranged, for example, on a second side face of the hydraulic unit 10 facing in the opposite direction from the electric motor 30. The electrical connections between the electric motor 30 and the control unit 20, e.g. for transmitting (sensor) signals, advantageously extend through the hydraulic unit 10 in order to protect the electrical connections.

The valves 15 are advantageously also arranged on the side face of the hydraulic unit 10 facing in the opposite direction from the electric motor 30, with the result that a simple electrical or magnetic connection between the valves 15 and the electronic control unit 20 is possible. The valves 15 are advantageously covered by the control device housing 22.

The motor vehicle control device 1 advantageously comprises a brake pedal sensation simulator (not illustrated) which, in the "brake-by-wire" operating mode imparts a pleasant brake pedal sensation to the vehicle driver. The brake pedal sensation simulator can extend entirely or partially inside the hydraulic unit 10. Alternatively, the brake pedal sensation simulator can be embodied as a stand-alone module. A pressure sensor which senses a pressure of the brake pedal sensation simulator is advantageously arranged on the printed circuit board 21 of the electronic control unit 20. The signal of said brake pedal sensation simulator can be used to sense the activation of the brake pedal (the driver's braking request) in a fallback level of the brake system, e.g. if the printed circuit board 12 with the first sensor element 11 is defective or can no longer be supplied with electrical energy.

In order to supply the motor vehicle control device 1 with electrical energy, for example a first electrical energy supply unit and a second electrical energy supply unit are provided (not illustrated in FIG. 1), wherein the two energy supply units are independent of one another.

Figure 2:
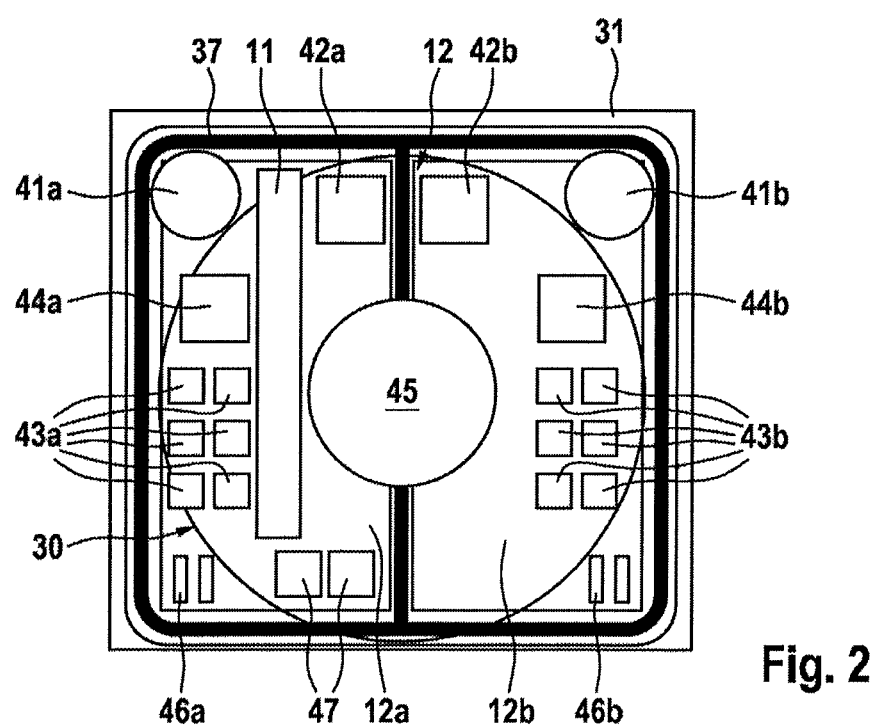
FIG. 2 shows a first exemplary embodiment of a second printed circuit board.

FIG. 2 illustrates a first exemplary embodiment of a second printed circuit board 12. FIG. 2 also shows the motor housing 31, a seal 37 and the electric motor 30 which is indicated schematically by a circle and is arranged behind the printed circuit board 12. The printed circuit board 12 is embodied, for example, in two parts with a first printed circuit board part 12a and a second printed circuit board part 12b, and has an opening 45 for leading through the pressure source 14. For this purpose, the printed circuit parts 12a, 12b are shaped, for example, with one semicircular cutout each, in such a way that they form a circular opening 45 for leading through the pressure source 14. However, the printed circuit board 12 can also be embodied in one part. The first sensor element 11 is arranged on the printed circuit board 12 (for example the printed circuit board part 12a). Furthermore, for example at least one capacitor 41a, a microcontroller 42a for performing open-loop/closed-loop control of the electric motor 30, at least one driver component 43a, a further microcontroller 44a (GDU: Gate Driver Unit) and a connecting element 46a for connecting to an electrical energy source are provided on the printed circuit board 12 (for example printed circuit board part 12a).

The GDU 44a is preferably an integrated circuit module with elements which actuate and monitor the bridge drivers 43a. The modules are used to perform actuation in three-phase brushless motors. Alternatively, the drivers 43a can be integrated into the GDU 44a.

The power electronics 40 (see FIG. 1) which have the purpose of actuating the electric motor 30 and are arranged on the second printed circuit board 12 (for example the printed circuit board part 12a) preferably comprise six driver components 43a and the GDU 44a.

The electronics of the printed circuit board 12 are advantageously embodied redundantly on the two printed circuit board parts 12a, 12b. For example, a capacitor 41a or 41b, a microcontroller 42a or 42b for performing open-loop/ closed-loop control of the electric motor 30, at least one driver component 43a or 43b (preferably six driver components 43a or 43b), a GDU 44a or 44b and a connecting element 46a or 46b for connecting to an electrical energy source are therefore provided on each of the printed circuit board parts 12a, 12b.

The first sensor element is arranged on just one of the printed circuit board parts, for example on the printed circuit board part 12a.

Each printed circuit board part 12a, 12b is advantageously supplied by a separate electrical energy source (redundant energy supply).

At least one driver 47 for actuating an electric parking brake or integrated parking brake is advantageously located on the printed circuit board 12, for example on one of the printed circuit board parts 12a.

Figure 3:
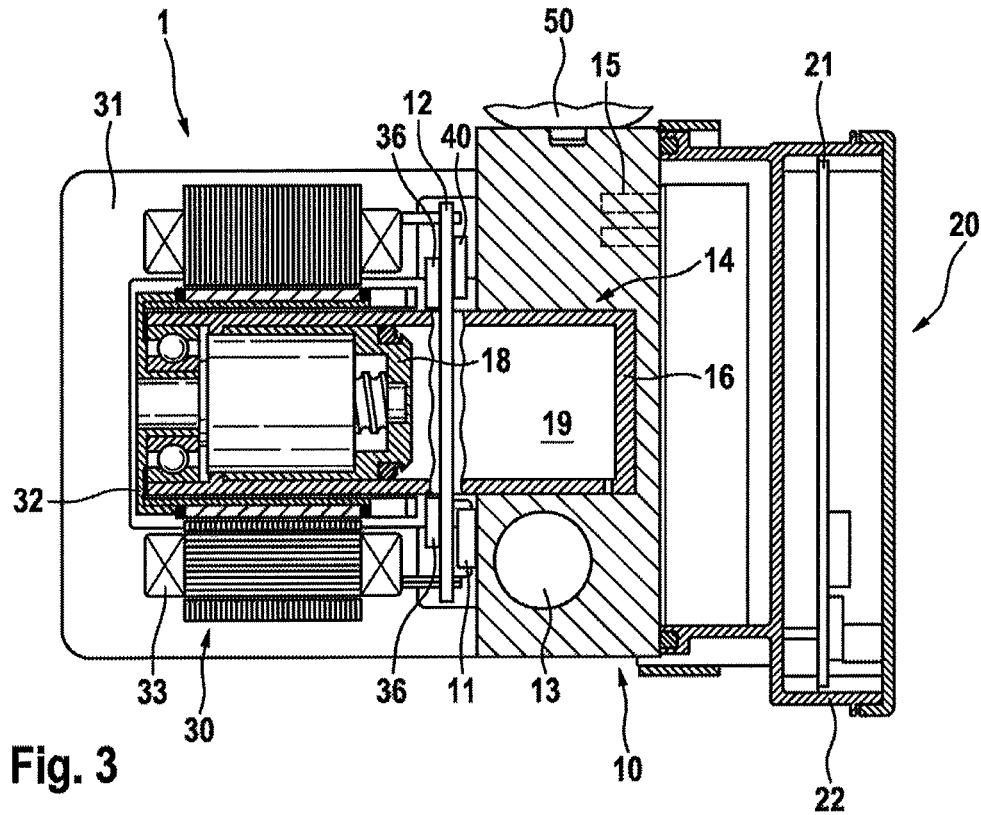
FIG. 3 shows a second exemplary embodiment of an electrohydraulic motor vehicle control device according to an aspect of the invention.
Figure 4:
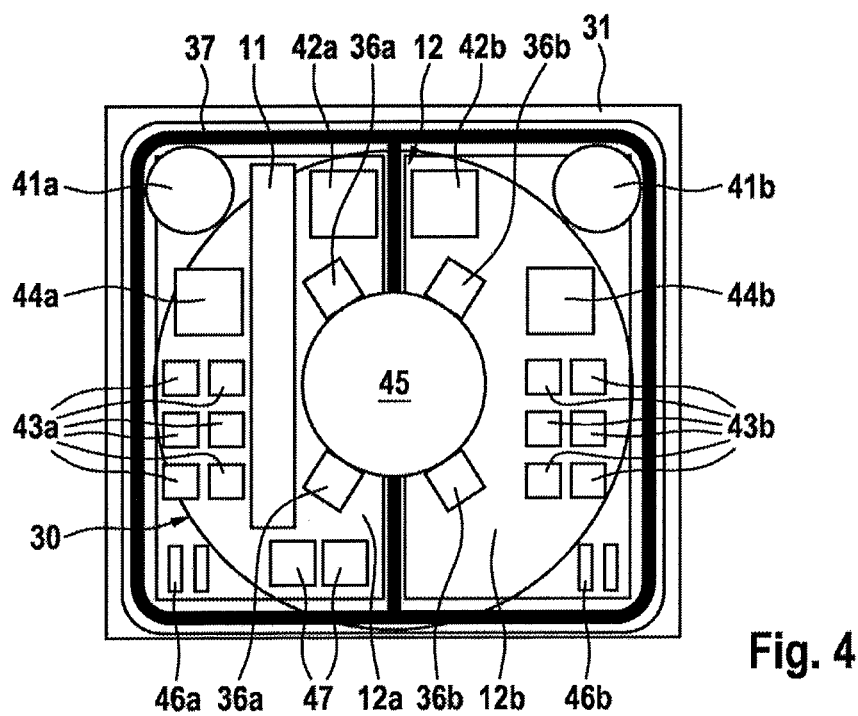
FIG. 4 shows a second exemplary embodiment of a second printed circuit board.

FIG. 3 schematically illustrates a second exemplary embodiment of an electrohydraulic motor vehicle control device according to an aspect of the invention, and FIG. 4 schematically illustrates a second exemplary embodiment of a second printed circuit board 12. These exemplary embodiments differ from the exemplary embodiments illustrated in FIGS. 1 and 2 in respect of the sensor system for sensing a location or position of the electric motor 30. For example, two second sensor elements 36 for sensing a rotational angle of the rotor 32 of the electric motor 30 are present on the second printed circuit board 12. The sensor elements 36 are arranged on the face of the second printed circuit board 12 which faces the electric motor 30.

The printed circuit board 12 is arranged, for example, between the first side face of the hydraulic unit 10 and the electric motor 30. As a result, the line conduction of the sensor signals of the first sensor element 11 and the second sensor elements 36 can be implemented directly on the second printed circuit board 12. This is not only cost-effective but also provides a saving in respect of the overall length of the motor.

The second sensor elements 36 are e.g. part of a (second) sensor device for sensing a location or position of the electric motor. In this context, the second sensor device comprises a position encoder (not illustrated) which is arranged on a rotating part of electric motor 30 and a measuring pickup which is formed by the second sensor elements 36 or comprises the latter.

In addition to the sensor elements 36, for example the entire electronic evaluation system or at least part of the electronic evaluation system which is assigned to the second sensor element and/or the second sensor device, is also arranged on the second printed circuit board 12.

The second sensor elements 36 are advantageously positioned adjacent to the piston 16, projecting through the second printed circuit board 12, of the pressure source 14, e.g. the second sensor elements 36 are arranged concentrically around the piston 16, and therefore around the hollow shaft of the electric motor 30.

As is apparent from FIG. 4, the printed circuit board 12 is embodied, for example, in two parts with the first printed circuit board part 12a and the second printed circuit board part 12b, wherein the second sensor elements 36 are provided redundantly on the first and second printed circuit board parts 12a, 12b. That is to say two second sensor elements 36a for sensing the rotational angle of the rotor 32 are present on the printed circuit board part 12a, and two second sensor elements 36b for sensing the rotational angle of the rotor 32 are present on the printed circuit board part 12b.

All the second sensor elements 36a, 36b are advantageously arranged concentrically around the piston 16, therefore around the hollow shaft of the electric motor 30, and on the face of the second printed circuit board 12 which faces the electric motor 30.

In known electrohydraulic motor vehicle control devices, the position sensor system of the pedal travel (first sensor element) and the position sensor system of the electric motor (second sensor element) are integrated into the electronic control unit which is arranged on the side of the hydraulic unit lying opposite the electric motor (i.e. valve side). When the spacing is small, both sensors can be influenced by the external magnetic fields (e.g. of the valve coils) and their signals can therefore be falsified. Furthermore, a complex and expensive gear mechanism has to be provided for the mechanical transmission of the rotational movement of the electric motor to the electronic control unit side.

In order to overcome the specified disadvantages, the entire position sensor system (first sensor element 11 and second sensor element 36 and, in particular, associated sensor electronics) or at least part of the position sensor system (e.g. the first sensor element 11 and, in particular, associated sensor electronics, or e.g. the second sensor element 36 and, in particular, associated sensor electronics) is preferably arranged separately from the electronic control unit 20 on a second printed circuit board 12 which is arranged in a region of the electric-motor-side side face of the hydraulic unit 10. This provides advantages with respect to the box volume, the costs and the performance.

Furthermore, with respect to the motor position sensor system, this means that the complex execution of the mechanical rotational movement of the motor by the hydraulic unit 10 is no longer necessary.

The arrangement of the position sensor elements 11, 36 between the electric motor 30 and the hydraulic unit 10 is particularly advantageous. As a result, the line conduction of the signals can be implemented directly on the motor-side printed circuit board 12. This is not only cost-effective but also provides a saving in respect of the overall length of the motor 30.

The first sensor device and the second sensor device are advantageously based on the same measuring principle, which simplifies the sensor electronic evaluation system on the second printed circuit board 12. An eddy current measuring principle, which is insensitive to magnetic interference fields, is particularly preferably applied. There is sufficient space for the sensor system on the second printed circuit board 12, and it is not necessary to accommodate it on the printed circuit board 21 of the electronic control unit 20.

The motor position sensor system is preferably embodied doubly, i.e. the second sensor element or elements 36 is/are arranged on two separate motor-side second printed circuit board parts 12a, 12b with a different on-board power supply system.

For the sensing of the pedal travel (first sensor device) it is possible to use the LIPS principle (Linear Inductive Position Sensor). In this context, a measuring coil group is arranged (as a measuring pickup) on the motor-side printed circuit board 12 directly on the hydraulic unit 10. The position encoder is e.g. a magnet in the pressure space of the master brake cylinder 13. Measures for shielding the rotor magnets are conceivable by means of a sheet-metal shield or sheet-metal shields. However, a metal target (position encoder) which is mechanically connected to the brake pedal rod/pressure rod) can also be moved in a chamber on the hydraulic unit 10. The movement of said target is sensed through a seal-forming separating wall, by a coil which is printed onto the motor-side printed circuit board 12 (measuring pickup). This principle is largely insensitive to magnetic interference fields.

A further advantage of the separation of the position sensor electronics (on the printed circuit board 12) from the electronics of the electronic control unit (on the printed circuit board 21) is the reduction in the number of possible common mode faults in the case of redundant interpretation of the electronics. It is therefore possible, for example, for the redundant voltage supply of the sensors (if appropriate even 48 V) to be kept completely away from the electronic control unit 20.

As a result of the combination with power electronics, also arranged on the electric-motor-side printed circuit board 12, for the electric motor 30:
- the same printed circuit board 12 can be used,
- the microcontroller 42a or 42b which is present can carry out synergetically both commutation calculations of the electric motor 30 and sensor signal-conditioning calculations of the first and second sensor devices (11, 36),
- a completely autonomous normal braking function can be presented which starts with the sensing of the driver's braking request (pedal travel sensor signal) and is continued with the calculation of the setpoint braking pressure value and the calculation of the associated rotational angle position up to the point when the electric motor 30 is correspondingly actuated.

The invention claimed is:

1. An electrohydraulic motor vehicle control device for a motor vehicle brake system, the motor vehicle control device comprising:
   a hydraulic unit with electrically activated valves and a brake pedal-activated master brake cylinder, the hydraulic unit having a first side face, a second side face opposite the first side face, and four orthogonal intervening faces extending orthogonally relative to the first side face and the second side face and extending between and separating the first side face from the second side face,
   an electronic control unit which comprises a first printed circuit board with electrical and/or electronic components for actuating the valves,
   an electric motor for driving an electrically controllable, hydraulic pressure source, wherein the electric motor is arranged on the first side face of the hydraulic unit,
   a second printed circuit board arranged on the first side face of the hydraulic unit, and
   a first sensor element for sensing activation of the brake pedal arranged on the second printed circuit board, the first sensor element being a linear inductive position sensor configured to sense a position of a shiftable part of the master brake cylinder.

2. The motor vehicle control device as claimed in claim 1, wherein the first sensor element for sensing activation of the brake pedal is arranged on a face of the second printed circuit board which faces the hydraulic unit.

3. The motor vehicle control device as claimed in claim 2, wherein the second printed circuit board is arranged between the first side face of the hydraulic unit and the electric motor.

4. The motor vehicle control device as claimed in claim 1, wherein the second printed circuit board is arranged between the first side face of the hydraulic unit and the electric motor.

5. The motor vehicle control device as claimed in claim 1, wherein one or more second sensor elements for sensing a location or position of the electric motor is/are arranged on the second printed circuit board.

6. The motor vehicle control device as claimed in claim 5, wherein the second sensor element or elements is/are arranged on a face of the second printed circuit board which faces the electric motor.

7. The motor vehicle control device as claimed in claim 1, wherein the second printed circuit board has an opening through which part of the pressure source projects.

8. The motor vehicle control device as claimed in claim 7, wherein one or more second sensor elements for sensing a location or position of the electric motor is/are arranged on the second printed circuit board and adjacent to the part of the pressure source which projects through the second printed circuit board.

9. The motor vehicle control device as claimed in claim 7, wherein one or more second sensor elements for sensing a location or position of the electric motor is/are arranged on the second printed circuit board and are arranged around the part of the pressure source which projects through the second printed circuit board.

10. The motor vehicle control device as claimed in claim 1, wherein the second printed circuit board is embodied in two parts with a first and a second printed circuit board part, wherein the first sensor element is arranged only on one of the printed circuit board parts.

11. The motor vehicle control device as claimed in claim 10, wherein one or more second sensor elements for sensing a location or position of the electric motor are arranged on each of the first and the second printed circuit board parts of the second printed circuit board.

12. The motor vehicle control device as claimed in claim 10, wherein the first and second printed circuit board parts are embodied in such a way that they form an opening through which part of the pressure source projects.

13. The motor vehicle control device as claimed in claim 1, wherein power electronics components for actuating the electric motor are arranged on the second printed circuit board.

14. The motor vehicle control device as claimed in claim 1, wherein a brake pedal sensation simulator is arranged at least partially in the hydraulic unit, wherein a pressure sensor which senses a pressure of the brake pedal sensation simulator is arranged on the first printed circuit board of the electronic control unit.

15. The motor vehicle control device as claimed in claim 1, wherein the shiftable part of the master brake cylinder is a piston of the master brake cylinder.

16. The motor vehicle control device as claimed in claim 1, wherein the first side face is a first planar side face, and the second side face is a second planar side face which is not coplanar with the first planar side face.

17. The motor vehicle control device as claimed in claim 1,
   wherein the electrically controllable, hydraulic pressure source comprises a hydraulic cylinder-piston arrangement having a piston and a cylinder, and
   the cylinder of the hydraulic cylinder-piston arrangement extends through an opening in the second printed circuit board and into the first side face of the hydraulic unit.

* * * * *